Jan. 24, 1956  E. OLSON ET AL  2,732,038
ANTI-STALL DEVICE
Filed June 7, 1950
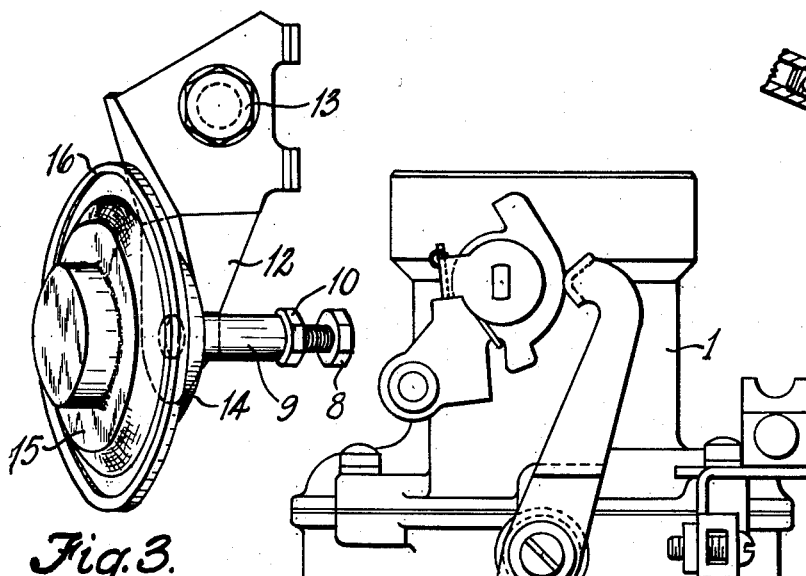
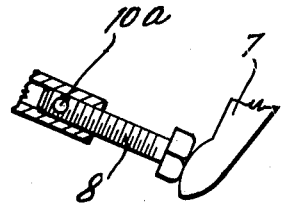
Fig. 3.
Fig. 7.
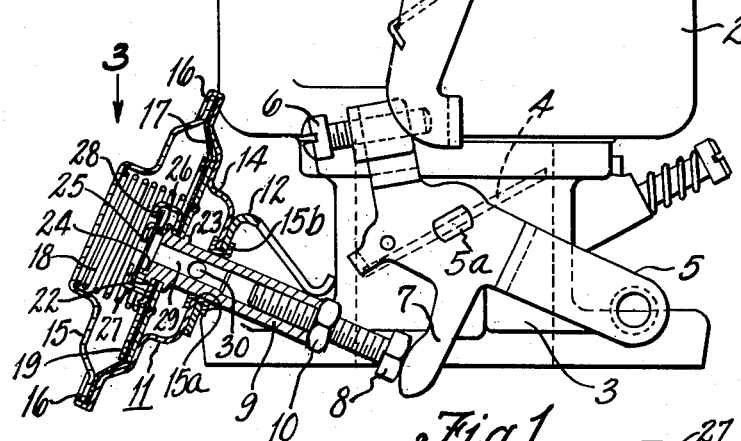
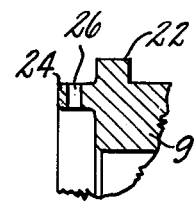
Fig. 1.
Fig. 4.
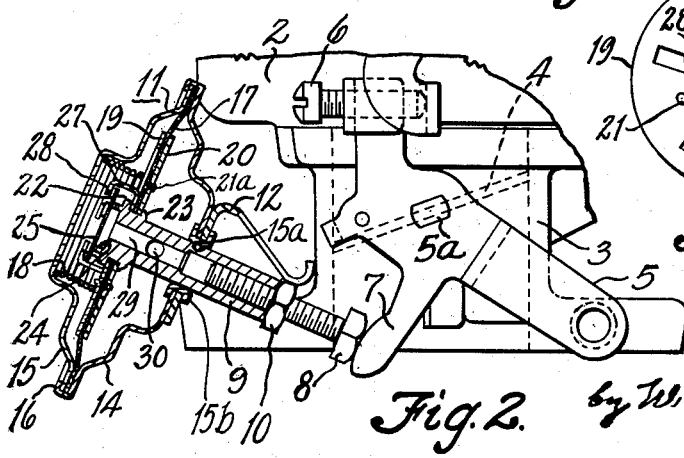
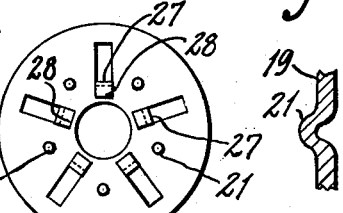
Fig. 2.
Fig. 5.
Fig. 6.
INVENTORS
ELMER OLSON
JOHN M. KELLY
GEORGE L. GIBBS JR.
ERWIN J. REPPERT
by Willits Hausman & Fedu
their ATTORNEYS

United States Patent Office 2,732,038
Patented Jan. 24, 1956

2,732,038
ANTI-STALL DEVICE

Elmer Olson, John Martin Kelly, George L. Gibbs, Jr., and Erwin J. Reppert, Rochester, N. Y., assignors to General Motors Corporation, Detroit, Mich., a corporation of Delaware Application June 7, 1950, Serial No. 166,748

7 Claims. (Cl. 188—96)

This invention relates to carburetors for internal combustion engines and more particularly to a mechanism for automatically preventing rapid movement of the throttle to fully closed position upon release of the accelerator pedal which is normally employed in automotive vehicles to manually operate such throttle in order to control the quantity of mixture supplied to the engine.

In carburetors which are used on automotive vehicles having the ordinary manual gear shift, if the accelerator pedal is released to permit the throttle to be closed, a spring connected to the accelerator pedal returns it to its normal or inoperative position, and effects closing of the throttle. The engine will then slow down, but unless the clutch is released, such engine will not slow down any faster than does the speed of the vehicle because the engine is being driven by the movement of the vehicle. However, with certain types of automatic transmissions which are now in use to transmit power from the engine to drive the wheels of the vehicle, if the accelerator pedal is released and the vehicle starts to slow down, the driving connection between the engine and the vehicle is interrupted and the engine is not driven by the vehicle. In devices of this kind, the engine may slow down very rapidly and there is a tendency for the engine to stall upon release of the accelerator pedal. The throttle is moved rapidly to its closed position and the quantity of mixture supplied to the engine is reduced so rapidly that it becomes insufficient to keep the engine running, particularly if the brakes are applied immediately after the accelerator pedal is released. The principal purpose of this invention is to provide means for preventing any stalling of the engine which might follow release of the accelerator pedal by the operator of a vehicle employing the type of transmission referred to.

According to the present invention, this purpose is accomplished by the provision of an air dash pot having a member which is engaged by an arm secured to the throttle shaft as the throttle approaches its closed position, so that the last part of the closing movement of the throttle is retarded and the throttle is prevented from closing sufficiently quickly to cause the engine to stall. This dash pot comprises a diaphragm which is secured in a housing and has a stem or plunger attached thereto which is engaged by the above mentioned arm on the throttle shaft so as to move the diaphragm as the throttle approaches closed position. As the diaphragm is moved, it forces air from a closed chamber on one side of the diaphragm through a restricted opening into a chamber on the other side thereof. A relatively large passage connects the chambers on opposite sides of the diaphragm, but this passage is closed by a valve when the diaphragm is moved as described so that the only outlet from the closed chamber is through the restricted opening. Therefore, the diaphragm must move slowly as the air is displaced from the closed chamber and in this manner the last part of the movement of the throttle toward its closed position is retarded.

Further objects and advantages of the present invention will be apparent from the following description, reference being had to the accompanying drawings, wherein a preferred embodiment of the present invention is clearly shown.

In the drawings:

Fig. 1 is a side elevation of a carburetor provided with the above described mechanism for retarding the closing movement of the throttle thereof, showing the diaphragm and associated parts in section, and in the position they occupy when the retarding action begins.

Fig. 2 is an elevation showing the outlet of the carburetor with the diaphragm and associated parts in section in the position they occupy when the throttle reaches its closed position.

Fig. 3 is a detail view of the diaphragm housing seen from above, as indicated by the arrow 3 in Fig. 1.

Figs. 4, 5 and 6 are fragmentary views showing certain details of the construction and Fig. 7 is a modified form of one structural detail.

Since the particular construction of the carburetor forms no part of the present invention, the carburetor is merely shown in elevation, and is a carburetor of conventional type in which fuel and air are mixed to form a properly combustible mixture which is supplied to the engine. The carburetor housing comprises three main sections, an air inlet 1, a fuel chamber 2, and a mixture outlet portion 3, which is adapted to be secured to the manifold in the usual way. A throttle 4, shown in dotted lines, is mounted in the outlet portion 3 on a shaft journalled for rotation in the walls thereof and an operating arm 5 is secured to one end 5a of the shaft, the arm being manually operable to move the throttle to different positions to control the engine speed in the usual way. Mounted on the operating arm 5 is an adjustable screw 6 which is adapted to engage a stop to limit the closing movement of the throttle so as to determine its normal closed position. Such screw is adjustable to vary the normal closed position of the throttle so as to variably determine the idling speed of the engine, as is customary in substantially any carburetor. So far as the present invention is concerned, it is unnecessary to describe any more of the construction of the carburetor, as the invention is applicable to any conventional type of carburetor.

In order to retard the final closing movement of the throttle, the operating arm 5 has projecting therefrom an arm 7 which is adapted to engage an adjustable screw 8 which is screwed into one end of a sleeve 9 and may be locked in any adjusted position with respect thereto by lock nut 10. The sleeve 9 is slidable in an opening in the diaphragm housing, which is indicated in its entirety by reference number 11 (Fig. 3), and which is supported by a bracket 12 adapted to be secured to the outlet flange of the carburetor by one of the bolts 13 by means of which the carburetor is secured to the engine manifold. The bracket for supporting the diaphragm housing does not have to be secured in position by one of the carburetor attaching bolts 13 as shown, but may be supported in any other suitable way so long as the element 8 is properly positioned to be engaged by the arm 7 which projects from the throttle operating arm 5.

The diaphragm housing includes two cup-shaped members 14 and 15 which are secured together by crimping a portion 16 of the member 14 over the outer periphery of the member 15 with the outer edg of diaphragm 17 secured between members 14 and 15 so as to form an airtight joint. A collar 15a has an opening in the center in which sleeve 9 is slidable and flanges 15b between which the supporting bracket 12 and the part 14 of the diaphragm housing are tightly clamped. A spring 18, which is received between the diaphragm assembly and the member 15, normally holds the parts in the position shown in Fig. 1.

The diaphragm 17 is secured in position between two metal protecting plates 19 and 20, which, with the diaphragm, form what may be termed a diaphragm assembly. The plates 19 and 20 are dented by a suitable tool as indicated in Fig. 6 to form small projections 21 and 21a on the opposite sides of plates 19 and 20, respectively. These projections are provided for a purpose set forth hereinafter. The diaphragm assembly is held in position against a flange 22 at the left end of tube 9 as shown in Figs. 1 and 2 of the drawings by a shoulder 23 which is formed on the outer surface of the seleve 9 by a suitable tool after the diaphragm assembly has been properly positioned on such sleeve.

Formed at the left end of sleeve 9 and extending axially thereof is an annular flange 24 which forms a seat for a valve 25 and is also provided with a restricted opening 26, best shown in the enlarged detail view, Fig. 4. This valve is positioned within a cage formed by a plurality of fingers 27 which are cut out of the protecting plate 19 and bent as shown in Figs. 1 and 2, so that the bent ends 28 of such fingers extend inwardly with respect to the outer periphery of the valve member 25 and retain the valve in a position closely adjacent the end of the sleeve 9, but permit a limited movement of the valve as it is opened and closed. The valve 25 controls the flow of air through a passage 29 within the sleeve 9 and an orifice 30 considerably larger than the restricted opening 26 connects this passage with the space in the diaphragm housing to the right of the diaphragm assembly.

The aforesaid valve is preferably a flexible member formed of a suitable rubberized fabric and can be placed in position between the end of the flange 24 and the fingers 27 after the fingers 27 have been formed and the diaphragm assembly secured in position on the element 9. Moreover, by use of a flexible valve member such as described, the space required between the end of flange 24 and fingers 27 is reduced to a minimum because a flexible valve could open to permit flow through passage 29 even if the valve is not moved at its periphery.

The projections 21 are slightly closer to the periphery of the plate than are the bent-up fingers 27 and one end of the spring 18 is located just outside of such projections, being held thereby against any possible lateral displacement when the device is assembled. The plate 20 is very slightly dished in one direction and the projections 21a are provided to give a visual indication of the direction in which said plate is dished so as to facilitate proper assembling of the parts.

The diaphragm housing is supported on its supporting bracket 12 in such a way the end of the screw 8 lies in the path of movement of the arm 7 so that as the throttle is moved toward its closed position, it engages such arm during the last part of that movement. The position of the throttle at the time this engagement takes place may be variably determined by adjustment of the screw 8, so that the part of the closing movement of the throttle which is retarded can be varied to obtain just the degree of retardation which is desired.

When the arm 7 engages the screw 8, the force of the spring which returns the accelerator pedal to its inoperative position upon release thereof, being greater than the force of spring 18, the diaphragm assembly is moved to the left. This movement creates a pressure on the valve 25 which is effective to close the valve and hold it closed until the movement of the diaphragm to the left stops. During this movement of the diaphragm air is forced from the space in the diaphragm housing at the left of the diaphragm into the passage 29 through the very restricted orifice 26 and such air passes into the space at the right of the diaphragm assembly through the orifice 30. Since the opening 26 is quite small, the transfer of air from the space to the left of the diaphragm to the space at its right is very slow, the movement of the diaphragm toward the left is correspondingly slow and the closing movement of the throttle after engagement of the arm 7 with the screws 8 is retarded in accordance with the movement of the diaphragm, which will continue to move slowly until the throttle reaches its normal closed position. This slowing down of the throttle closing will effectively prevent engine stalling and the means disclosed herein for retarding the closing of the throttle is positive in its action, simple in design and inexpensive to manufacture.

When the throttle is opened manually, however, to effect an increase in speed of the engine, the pressure of the accelerator spring on the diaphragm assembly is eliminated and when this takes place, the spring 18 moves the diaphragm assembly to the right, which will force air from the space to the right of the diaphragm through the orifice 30 and into the space 29. The pressure of this air will immediately unseat the valve 25, which will permit a free flow of air into the space to the left of the diaphragm. This action will enable the parts of the diaphragm to assume the position shown in Fig. 1, substantially immediately so as to be in proper position to oppose any subsequent closing of the throttle whenever the throttle is open.

In Fig. 7 a slightly modified arrangement is shown in which the use of the lock nut 10 is eliminated. Instead of using such a lock nut to hold the element 8 in its adjusted position, as in the device of Figs. 1 and 2, a plug of nylon or other suitable material is positioned in a hole extending across the stem of the adjustable screw 8 in a direction normal to the axis thereof. This plug has a length equal to the diameter of the screw 8 and the frictional engagement of the ends of this plug with the threads on the inside of sleeve 9 holds the screw against any rotary movement with sufficient force to make the use of a lock nut such as 10 unnecessary.

While the embodiment of the present invention as herein disclosed, constitutes a preferred form, it is to be understood that other forms might be adopted.

What is claimed is as follows:

1. A dash pot for retarding the closing movements of a carburetor throttle valve which is provided with an arm movable therewith for engagement by a control member of said dash pot, said dash pot comprising a housing, a diaphragm dividing said housing into two chambers and operative when moved to transfer air from one chamber to the other, said control member connected to said diaphragm and extending outwardly of the housing, means forming an unrestricted orifice through which air is forced when the diaphragm is moved in one direction, means for preventing flow of air through said orifice when the diaphragm is moved in the other direction, means forming a restricted orifice through which air is forced when the diaphragm is moved in said other direction, means providing an unrestricted air passage connecting one of said chambers with both said orifices and effective to convey air from said chamber to the unrestricted orifice when the diaphragm is moved in one direction and from the restricted orifice to said chamber when the diaphragm is moved in the other direction whereby movement of the control member in one direction is retarded and movement thereof in the opposite direction is unretarded.

2. A dash pot for retarding the closing movements of a carburetor throttle valve which is provided with an arm movable therewith for engagement by a control member of said dash pot, said dash pot comprising a housing, a diaphragm dividing said housing into two chambers and operative when moved to transfer air from one chamber to the other, said control member connected to said diaphragm and extending outwardly of the housing, means forming an unrestricted orifice through which air is forced when the diaphragm is moved in one direction, means for preventing flow of air through said orifice when the diaphragm is moved in the other direction, means forming a restricted orifice through which air is forced when the diaphragm is moved in said other direction, an air passage formed in the control member connecting one of said chambers with both said orifices and effective to convey air from said chamber to the unrestricted orifice when the diaphragm is moved in one direction and from the restricted orifice to said chamber when the diaphragm is moved in the other direction whereby movement of the control member in one direction is retarded and movement thereof in the opposite direction is unretarded.

3. A dash pot for retarding the closing movements of a carburetor throttle valve which is provided with an arm movable therewith for engagement by a control member of said dash pot, said dash pot comprising a housing, a diaphragm dividing said housing into two chambers and operative when moved to transfer air from one chamber to the other, said control member connected to said diaphragm and extending outwardly of the housing, means forming an unrestricted orifice through which air is forced when the diaphragm is moved in one direction, means for preventing flow of air through said orifice when the diaphragm is moved in the other direction, means forming a restricted orifice through which air is forced when the diaphragm is moved in said other direction, said control member comprising a hollow sleeve having an axial air passage therein connecting one of said chambers with both said orifices and effective to convey air from said chamber to the unrestricted orifice when the diaphragm is moved in one direction and from the restricted orifice to said chamber when the diaphram is moved in the other direction whereby movement of the control member in one direction is retarded and movement thereof in the opposite direction is unretarded.

4. A dash pot for retarding the closing movements of a carburetor throttle valve, which is provided with an arm movable therewith for engagement by a control member of said dash pot, said dash pot comprising a housing, a diaphragm dividing said housing into two chambers and operative when moved to transfer air from one chamber to the other, said control member connected to said diaphragm and extending outwardly of the housing, means forming a constantly open restricted orifice through which air is forced when the diaphragm is moved in one direction, means forming a normally unrestricted orifice through which air is forced when the diaphragm is moved in the other direction, a valve of flexible material controlling the unrestricted orifice and movable to a position to close said orifice by the effect of pressure on said valve when the diaphragm is moved in one direction and means providing an unrestricted passage connecting one of said chambers with the valve controlled orifice and with the constantly open orifice, whereby movement of the control member is retarded upon movement of the diaphragm in one direction and unretarded upon movement in the opposite direction.

5. A dash pot for retarding the closing movements of a carburetor throttle valve, which is provided with an arm movable therewith for engagement by a control member of said dash pot, said dash pot comprising a housing, a diaphragm dividing said housing into two chambers and operative when moved to transfer air from one chamber to the other, said control member connected to said diaphragm and extending outwardly of the housing, means forming a constantly open restricted orifice through which air is forced when the diaphragm is moved in one direction, means forming a normally unrestricted orifice through which air is forced when the diaphragm is moved in the other direction, a valve of flexible material controlling the unrestricted orifice and movable to a position to close said orifice by the effect of pressure on said valve when the diaphragm is moved in one direction, valve retaining means for holding the valve in a position adjacent the orifice controlled thereby, said retaining means comprising a plurality of retaining members projecting from and supported by the diaphragm so as to be engageable by said valve upon opening movement thereof, and means providing an unrestricted passage connecting one of said chambers with the valve controlled orifice and with the constantly open orifice, whereby movement of the control member is retarded upon movement of the diaphragm in one direction and unretarded upon movement in the opposite direction.

6. A dash pot for retarding the closing movements of a carburetor throttle valve, which is provided with an arm movable therewith for engagement by a control member of said dash pot, said dash pot comprising a housing, a diaphragm dividing said housing into two chambers and operative when moved to transfer air from one chamber to the other, said control member connected to said diaphragm and extending outwardly of the housing, means forming a constantly open restricted orifice through which air is forced when the diaphragm is moved in one direction, means forming a normally unrestricted orifice through which air is forced when the diaphragm is moved in the other direction, a substantially flat valve member controlling the unrestricted orifice and closed by pressure exerted thereon when the diaphragm is moved in one direction, valve retaining means for holding said valve member in a position adjacent the orifice controlled thereby comprising a plurality of fingers extending from the diaphragm adjacent the periphery of the valve member, said fingers having bent-over ends engageable by the valve member when moved to open position and limiting the opening movement thereof so that when open the valve is spaced from the orifice controlled thereby a distance substantially equal to the thickness of the valve member, and means providing an unrestricted passage connecting one of said chambers with the valve controlled orifice and with the constantly open orifice, whereby movement of the control member is retarded upon movement of the diaphragm in one direction and unretarded upon movement in the opposite direction.

7. A dash pot for retarding the closing movements of a carburetor throttle valve, which is provided wtih an arm movable therewith for engagement by a control member of said dash pot, said dash pot comprising a housing, a diaphragm assembly dividing the housing into two chambers and operative when moved to transfer air from one chamber to the other, said assembly comprising a flexible diaphragm fixed at its periphery and positioned between two rigid protecting plates, said control member connected to the diaphragm and extending outwardly of the housing, means forming a restricted orifice through which air is forced by movement of the diaphragm to retard movement of the diaphragm when moved by the control member, and means forming an unrestricted opening through which air is forced by the diaphragm when moved in the opposite direction so as to permit unretarded movement of the diaphragm, a spring having one end in engagement with one of said protecting plates and effective to move the diaphragm in said opposite direction, a plurality of projections extending from the plate engaged by the spring and surrounded by the end of the spring so as to prevent any lateral movement of the spring relative to the plate engaged thereby.

References Cited in the file of this patent

UNITED STATES PATENTS

| | | |
|---|---|---|
| 602,473 | Richards | Apr. 19, 1898 |
| 1,329,512 | Dodge | Feb. 3, 1920 |
| 1,656,349 | Garrision | Jan. 17, 1928 |
| 1,695,152 | Martindale | Dec. 11, 1928 |
| 1,722,155 | Myer | July 23, 1929 |
| 1,995,721 | Sanford | Mar. 26, 1935 |
| 2,033,396 | Perrini | Mar. 10, 1936 |
| 2,314,570 | Ball | Mar. 23, 1943 |
| 2,598,855 | Strebinger | June 3, 1952 |
| 2,630,886 | Lindahl | Mar. 10, 1953 |
| 2,680,610 | Harry | June 8, 1954 |